(12) United States Patent
Casey et al.

(10) Patent No.: US 7,734,282 B2
(45) Date of Patent: Jun. 8, 2010

(54) SYSTEM AND METHOD FOR PROVISIONING CUSTOMER PREMISES EQUIPMENT

(75) Inventors: Steven M. Casey, Littleton, CO (US); Bruce A. Phillips, Erie, CO (US)

(73) Assignee: Qwest Communications International Inc

( * ) Notice: Subject to any disclaimer, the term of this patent is extended or adjusted under 35 U.S.C. 154(b) by 917 days.

(21) Appl. No.: 10/652,719

(22) Filed: Aug. 28, 2003

(65) Prior Publication Data

US 2005/0048957 A1 Mar. 3, 2005

(51) Int. Cl.
*H04Q 7/20* (2006.01)

(52) U.S. Cl. .............. 455/414.3; 455/406; 455/411; 455/414.1; 705/26; 705/35

(58) Field of Classification Search ........... 455/3.05, 455/418, 419, 557, 414.3, 406, 411, 414.1, 455/456.2, 426.2, 3.03; 705/1, 26, 35; 345/810
See application file for complete search history.

(56) References Cited

U.S. PATENT DOCUMENTS

| | | | |
|---|---|---|---|
| 5,202,765 A | 4/1993 | Lineberry | |
| 5,740,075 A | 4/1998 | Bigham et al. | |
| 5,771,279 A * | 6/1998 | Cheston et al. | 379/93.17 |
| 5,784,683 A | 7/1998 | Sistanizadeh et al. | |
| 5,923,379 A | 7/1999 | Patterson | |
| 5,970,130 A * | 10/1999 | Katko | 379/201.01 |
| 5,971,921 A | 10/1999 | Timbel | |
| 5,983,068 A | 11/1999 | Tomich et al. | |
| 6,011,837 A * | 1/2000 | Malik | 379/114.1 |
| 6,097,515 A * | 8/2000 | Pomp et al. | 398/45 |
| 6,209,025 B1 | 3/2001 | Bellamy | |
| 6,282,189 B1 | 8/2001 | Eames | |
| 6,374,079 B1 * | 4/2002 | Hsu | 455/11.1 |
| 6,910,187 B2 * | 6/2005 | Felkey et al. | 715/733 |
| 2002/0010651 A1 * | 1/2002 | Cohn et al. | 705/26 |
| 2002/0140741 A1 * | 10/2002 | Felkey et al. | 345/810 |
| 2002/0161667 A1 * | 10/2002 | Felkey et al. | 705/26 |
| 2003/0026416 A1 | 2/2003 | Fusco | |
| 2003/0046202 A1 * | 3/2003 | Knapp | 705/35 |
| 2003/0061068 A1 * | 3/2003 | Curtis | 705/1 |
| 2004/0022237 A1 * | 2/2004 | Elliott et al. | 370/356 |
| 2004/0075675 A1 * | 4/2004 | Raivisto et al. | 345/700 |
| 2004/0110497 A1 * | 6/2004 | Little | 455/418 |
| 2004/0137897 A1 * | 7/2004 | Teixeira | 455/423 |
| 2004/0176085 A1 * | 9/2004 | Phillips et al. | 455/418 |
| 2004/0203751 A1 * | 10/2004 | Banaei | 455/432.1 |
| 2006/0050862 A1 * | 3/2006 | Shen et al. | 379/219 |
| 2006/0165066 A1 * | 7/2006 | Campbell et al. | 370/352 |
| 2006/0242290 A1 * | 10/2006 | Ishizaki et al. | 709/223 |

OTHER PUBLICATIONS

Frank, Edward and Holloway, Jack; "Connecting the Home with a Phone Line Network Chip Set", IEEE Micro, Mar.-Apr. 2000, pp. 2-14.

(Continued)

*Primary Examiner*—Tan Trinh (57) ABSTRACT

A method of provisioning telecommunication offerings includes receiving from a first provider a message at a services clearing house to provision a telecommunication offering at a customer's premises and processing the request into a provisioning message. The method also includes directing the provisioning message to the customer's premises, thereby causing the offering to be provisioned at the customer's premises.

24 Claims, 7 Drawing Sheets

OTHER PUBLICATIONS

U.S. Appl. No. 10/715,879, filed Nov. 17, 2003, Phillips et al.
U.S. Appl. No. 10/715,878, filed Nov. 17, 2003, Phillips et al.
U.S. Appl. No. 10/715,881, filed Nov. 17, 2003, Magarasevic et al.
U.S. Appl. No. 10/356,364, filed Jan. 31, 2003.
U.S. Appl. No. 10/652,718, filed Aug. 28, 2003.
U.S. Appl. No. 10/377,283, filed Feb. 27, 2003.
U.S. Appl. No. 10/377,290, filed Feb. 27, 2003.
U.S. Appl. No. 10/377,282, filed Feb. 27, 2003.
U.S. Appl. No. 10/367,596, filed Feb. 14, 2003.
U.S. Appl. No. 10/377,281, filed Feb. 27, 2003.
U.S. Appl. No. 10/444,941, filed May 22, 2003.
U.S. Appl. No. 10/624,454, filed Jul. 21, 2003.
U.S. Appl. No. 10/367,597, filed Feb. 14, 2003.
U.S. Appl. No. 10/448,249, filed May 29, 2003.
U.S. Appl. No. 10/377,584, filed Feb. 27, 2003.
U.S. Appl. No. 10/377,280, filed Feb. 27, 2003.
U.S. Appl. No. 10/356,688, filed Jan. 31, 2003.
U.S. Appl. No. 10/356,338, filed Jan. 31, 2003.
U.S. Appl. No. 10/676,418, filed Sep. 30, 2003.
U.S. Appl. No. 10/452,996, filed Jun. 2, 2003.
U.S. Appl. No. 10/632,602, filed Aug. 1, 2003.
U.S. Appl. No. 10/625,863, filed Jul. 22, 2003.
U.S. Appl. No. 10/644,667, filed Aug. 19, 2003.
U.S. Appl. No. 10/445,275, filed May 23, 2003.
U.S. Appl. No. 10/611,324, filed Jun. 30, 2003.
U.S. Appl. No. 10/632,661, filed Aug. 1, 2003.
U.S. Appl. No. 10/676,429, filed Sep. 30, 2003.

* cited by examiner

SYSTEM AND METHOD FOR PROVISIONING CUSTOMER PREMISES EQUIPMENT

CROSS-REFERENCES TO RELATED APPLICATIONS

The present invention is related to the following, commonly assigned U.S. Patent Applications, the entire disclosure of each of which is incorporated herein by reference for all purposes: U.S. patent application Ser. No. 10/356,688, filed on Jan. 31, 2003, and entitled "SYSTEMS, METHODS AND APPARATUS FOR PROVIDING A PLURALITY OF TELECOMMUNICATION SERVICES"; U.S. patent application Ser. No. 10/356,338, filed on Jan. 31, 2003, and entitled "CONFIGURABLE NETWORK INTERFACE DEVICE AND SYSTEMS AND METHODS FOR ITS USE"; U.S. patent application Ser. No. 10/356,364, filed on Jan. 31, 2003, and entitled "PACKET NETWORK INTERFACE DEVICE AND SYSTEMS AND METHODS FOR ITS USE".

BACKGROUND OF THE INVENTION

The present invention relates to provisioning telecommunication services and/or content. In the past, there has been no consistent interface between telecommunication service/content providers' networks and their customers' premises wiring. For instance, telephone service often has been hard-wired to the customer's premises wiring by a variety of methods, rendering service calls unnecessarily complicated and intrusive. Such services calls often required service personnel to enter the customer premises, creating logistical issues for the telecommunication service/content provider and increasing customer frustration. Moreover, the lack of any discrete interface between the customer's premises wiring and the provider's network sometimes forced the use of proprietary hardware from the customer's perspective and limited the provider's flexibility when considering options to upgrade or otherwise modify the network.

This problem has been exacerbated by increases in telecommunication services/content offerings available to customer premises. For instance, many telecommunication service/content providers (hereinafter, "service provider," or "provider" will be understood to mean a provider of either telecommunication service, content, or both, and "telecommunication service" or "telecommunication offering" will be understood to mean either telecommunication service, content, or both) now provide xDSL service to their customers, but those skilled in the art will recognize that there is little (if any) standardization among providers. Thus, implementations vary widely, each requiring different hardware and software configurations to be operable, and customers have little flexibility in choosing hardware. For instance, ADSL service frequently is deployed differently than VDSL service, and ADSL deployments themselves can vary from provider to provider. Likewise, telephone wiring schemes can vary widely among customer premises, requiring different types of hardware to enable and enhance services, such as filters to control interference, and the like. Further, a typical customer premises has multiple wiring networks, including one for video distribution (cable, satellite, VDSL, and the like), one for data distribution (Ethernet or the like, perhaps with a connection to an xDSL modem or cable modem), and another for telephone service, and these networks generally operate independently of one another. And if a customer wants to add a new telecommunication service, an expensive service call (often including one or more new cable drops and/or the installation of new premises wiring) likely will be required.

Given the wide variety of telecommunication information and services available in the marketplace, it would be helpful if a single entity could allow multiple providers to initiate services to a customer premises, increasing both efficiency for the providers and ease-of-use for the customer. This proliferation of telecommunication services also has created a need for a more flexible interface between providers' networks and the customers' locations. Preferably, such an interface would be addressable and/or programmable, so that the interface could quickly and easily be updated to accommodate new services and/or technologies. Further still, it would be advantageous to provide a provisioning system that would allow multiple providers to provision the same customer premises equipment.

The present inventor provides systems and methods for addressing these and other problems.

BRIEF SUMMARY OF THE INVENTION

Embodiments of the invention thus provide a method of provisioning telecommunication offerings. The method includes receiving from a first provider a message at a services clearing house to provision a telecommunication offering at a customer's premises and processing the request into a provisioning message. The method also includes directing the provisioning message to the customer's premises, thereby causing the offering to be provisioned at the customer's premises. The method may include receiving a request for the service from the customer and directing the request to the first provider. The method may include receiving from a second provider a message at the services clearing house to provision a different telecommunication offering at a different customer's premises, processing the request into a provisioning message, and directing the provisioning message to the different customer's premises, in which case, wherein the second provider is different from the first provider. Directing the provisioning message to the customer's premises may include directing the provisioning message to customer premises equipment at the customer's premises. The customer premises equipment may include a network interface device configured to receive provisioning information via a wireless transmission. The customer premises equipment may be selected from the group consisting of network interface device, video receiver, broadband modem, and telephone receiver.

In other embodiments, a method of provisioning telecommunication offerings includes receiving from a provider a message comprising an offering, and receiving from a consumer of telecommunication offerings an enrollment message. The message also may include providing a list of offerings to the consumer and receiving a request to provision at least one telecommunication offering to the consumer. The method also includes preparing a provisioning message relating to the request and transmitting the provisioning message to a location of the consumer, thereby causing the offering to be provisioned. Receiving from a provider a message comprising an offering may include receiving a type of offering, information indicating a type of customer premises equipment used to receive the offering, and information from which eligible consumers may be determined. The method may include storing information relating to the message in a centralized services database. Receiving from a consumer of telecommunication offerings an enrollment message may include receiving customer information comprising a type of customer premises equipment of the customer and information used to determine telecommunications offerings the customer is eligible to receive. Receiving a request to provision at least one telecommunication offering to the consumer may include receiving the request from the consumer. Receiving a request to provision at least one telecommunication offering to the consumer may include receiving the request from a provider. The method may include verifying the provider's authority to provision the service. Verifying the provider's authority to provision the service may include confirming the provider's identity using a digital certificate. Preparing a provisioning message relating to the request may include preparing the provisioning message using XML.

In still other embodiments, a telecommunication provisioning system includes a services clearing house configured to receive telecommunication offerings from a plurality of providers and direct the telecommunication offerings to a plurality of customer's via customer premises equipment. The system also includes a provisioning arrangement configured to receive requests to provision telecommunication offerings from a plurality of service providers to a plurality of customers. The telecommunication offerings may be selected from the group consisting of video programming, broadband access, and telephone service. The system may include a billing system that periodically provides to providers information relating to the telecommunication offerings provisioned to customers. The system also may include distribution network through which both telecommunication offerings and provisioning messages are provided from the services clearing house to customers. The provisioning arrangement may include means for communicating with each of the plurality of providers in a common provisioning language.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, a system is provided for provisioning telecommunication services and/or content to a customer's premises, along with methods for using the system. Telecommunication services include such services as voice mail, email, online games, voice services (e.g., voice over IP and POTS), data services (e.g., dynamic bandwidth, DSL services, VPN), and the like. Telecommunication content includes, for example, movies, music, games, CATV, and the like. In a specific embodiment, the system comprises an "open-architecture" network that allows multiple providers to provision customer premises equipment (CPE) via common infrastructure. The infrastructure may include an interface from the provider to the network, a processing system for processing provisioning messages, CPE, a transmission system for transporting information, including provisioning information and the actual service, from the provider to the customer's premises, and the like. In some embodiments, customers may be both consumers of services and providers of services to other consumers.

In a specific embodiment, providers communicate with the provisioning network using a standardized protocol, such as, for example, a provisioning language programmed in XML. Digital certificates may be employed to provide secure communication between among providers, the network, and customers.

Figure 1:
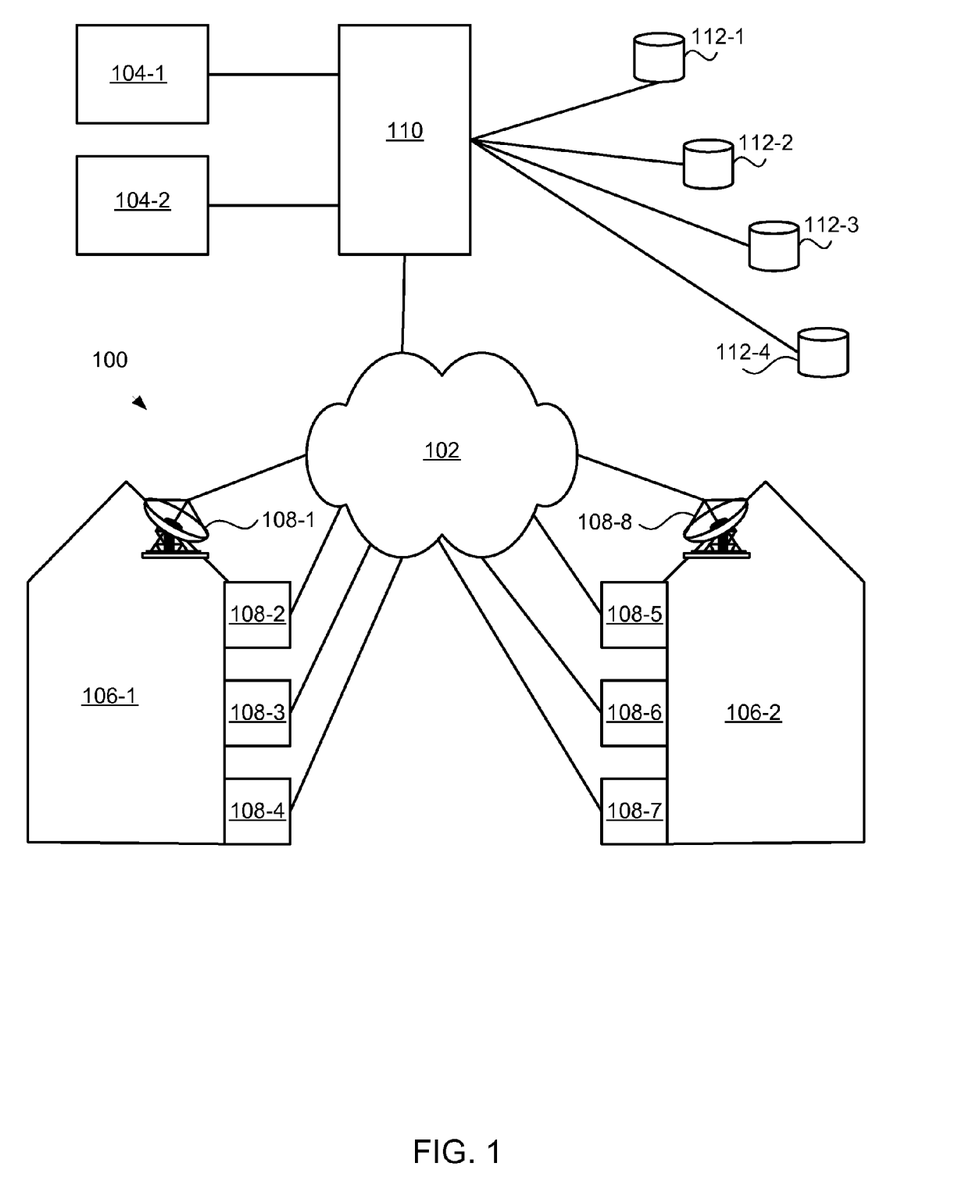
FIG. 1 illustrates a provisioning system according to embodiments of the invention.

Having described the present invention generally, attention is directed to FIG. 1, which illustrates one possible embodiment of a telecommunications services provisioning system 100. It is to be understood that the system 100 is provided for illustrative purposes only and other examples are possible, as is apparent to those skilled in the art in light of the disclosure herein. The system 100 includes a network 102 through which providers 104 provision telecommunication services to customers 106, which may be business, residential, or mobile locations. Thus, the network 102 may comprise both wired and wireless connections. In a specific example, the network 102 comprises at least a portion of the Internet.

The providers 104 may be any entity that makes one or more telecommunication services available to customers. For example, a provider may be a television programming provider, such as a cable or satellite company, a broadband services provider, a wired or wireless telephone service provider, and/or the like, or any combination of the foregoing. Many other examples are possible, some of which include a provider also being a consumer.

Customer locations may be equipped with customer premises equipment (hereinafter, CPE) 108. CPE may comprise, for example, wireless devices, such as satellite receivers or wireless telephones, cable boxes, tuners, wired telephones, home, office, or mobile appliances, and/or the like. In a specific example, CPE comprises a network interface device (hereinafter NID), as more fully described below. Thus, CPE 108 may be configured to receive provisioning instructions via the network 102 from providers 104, and, in some instances, CPE 108 may be configured to be provisioned by multiple providers 104.

The system 100 also includes a services clearing house 110 through which the providers 104 access the network 102. The services clearing house 110 may perform any of several functions. For example, the services clearing house 110 may verify a provider's privilege to access the network 102, receive and interpret a provider's provisioning instructions, direct provisioning messages to the appropriate CPE at an appropriate customer location, and/or the like. The services clearing house may function as an intermediary for settling a negotiation between the different components involved in provisioning a service. The services clearing house 110 also may perform routine maintenance of CPE. This may be in response to requests from service provides or in response to trouble reports from consumers. Such diagnostic requests may include both active (e.g., reboot) and passive (e.g., send data) commands.

The system 100 also may include one or more processing systems 112. The processing systems 112 may comprise computing systems together with storage arrangements for performing functions associated with the system 100. For example, a billing system 112-1 may maintain information such as customer billing addresses, customer orders, services provided to customers, and/or the like. Thus, when a provider provisions a new service to a customer, a record is created in the billing system 112-1 that initiates charging of the customer. Periodically, a customer is billed for all services provisioned to it. In this way, a customer may receive a single bill for telecommunication services from many different service provides. In a different example, the billing system may provide information to providers so that the providers may bill customers. In some cases, these two billing methods are combined.

A centralized services system 112-2 may provide services such as initial CPE configuration, provider enrollment, and/or the like. Using such a system, a customer may configure CPE for provisioning via the system 100. In doing so, the customer may configure the types of services the CPE may be used to receive, the type of connection through which the services will be received, and the like. Providers also may use the centralized services system 112-2 to configure the types of services they will provide and the CPE to which their services may be delivered. The centralized services system 112-2 also may provide general services to customers and providers such as context-sensitive help, historical billing and usage information, network-wide announcements, and/or the like.

A centralized network configuration system 112-3 may provide configuration and provisioning services to network components not necessarily located at either customer or provider locations. Such services may include setting up a link between a provider and CPE, storing protocol information for how to link to each type of CPE, and the like.

A centralized CPE configuration system 112-4 may store specific configuration information for CPE that may be used in connection with the system 100. Such information may include, for example, the type of CPE, the status of software or firmware loaded on the CPE, and the like. Such information may be used, for example, when a customer connects new CPE to the system. Periodically, the centralized CPE configuration system may query CPE connected to the network to determine if the CPE has been upgraded or reconfigured in any way.

The foregoing system description is but one possible example of a provisioning system, and those skilled in the art will recognize many other examples. Other exemplary systems may include the same components, different components, fewer components than that described above, or more components than that described above. Thus, the foregoing description is not to be considered limiting.

Figure 2A:
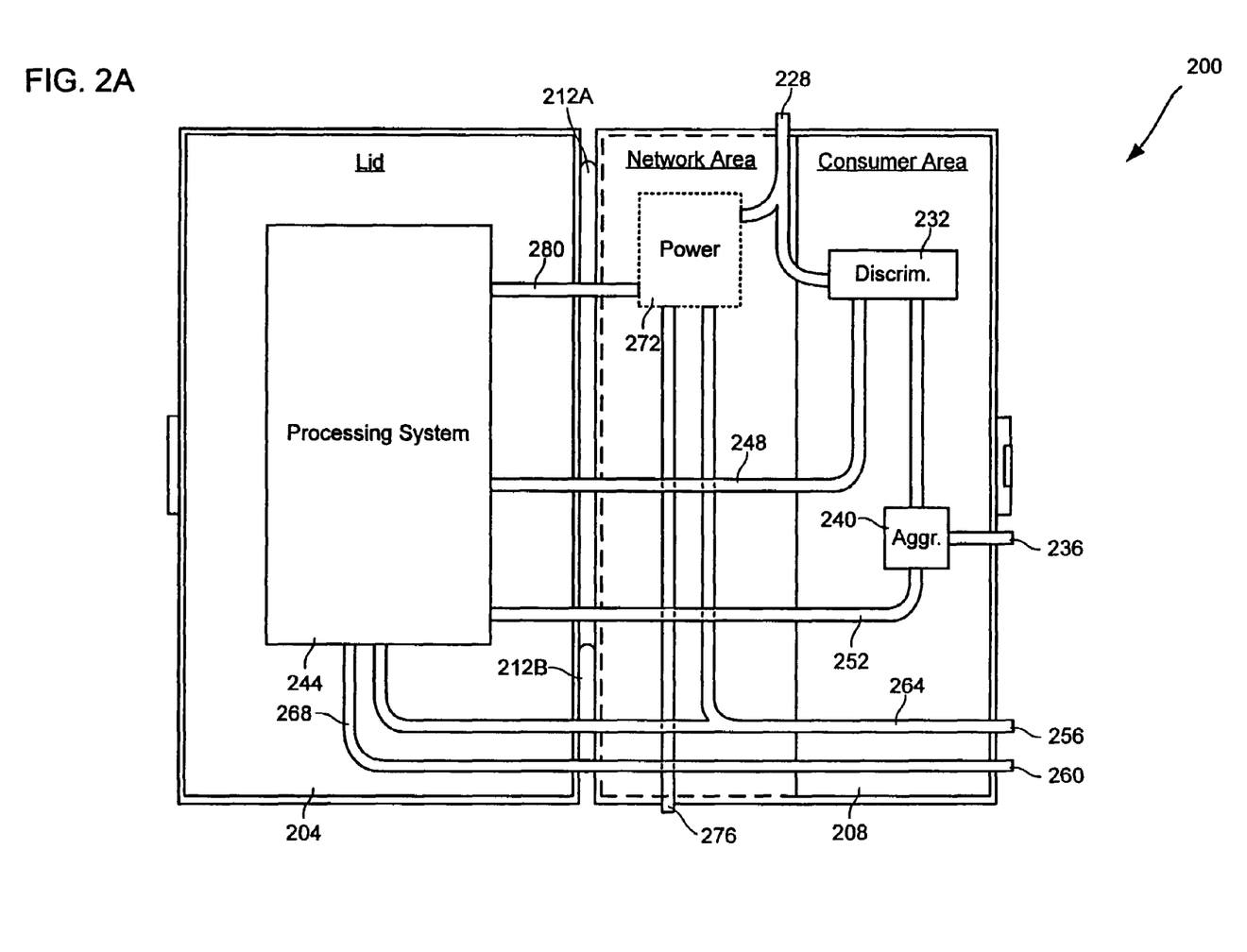
FIG. 2A illustrates a network interface device according to certain embodiments of the invention.
Figure 2B:
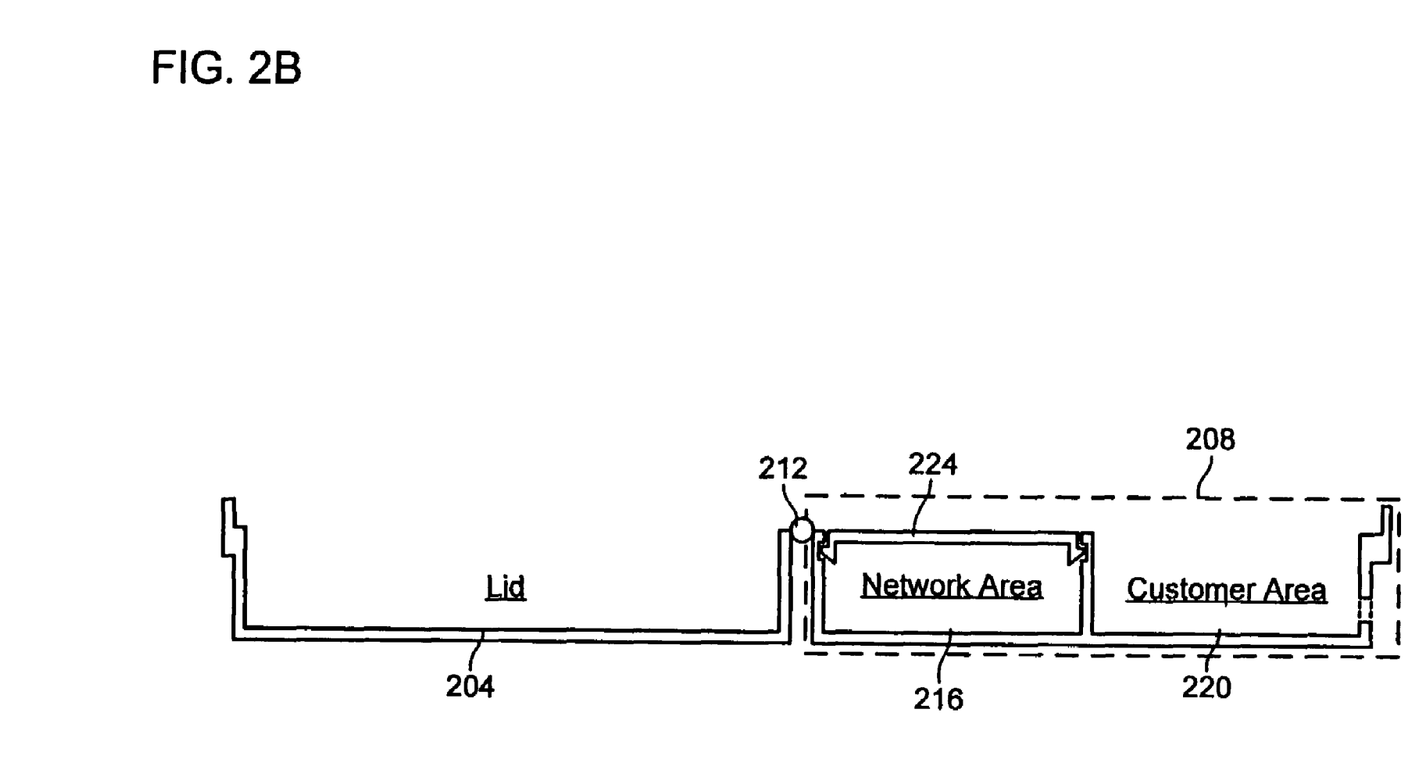
FIG. 2B is a cross-sectional drawing further illustrating the network interface device of FIG. 2A.
Figure 3:
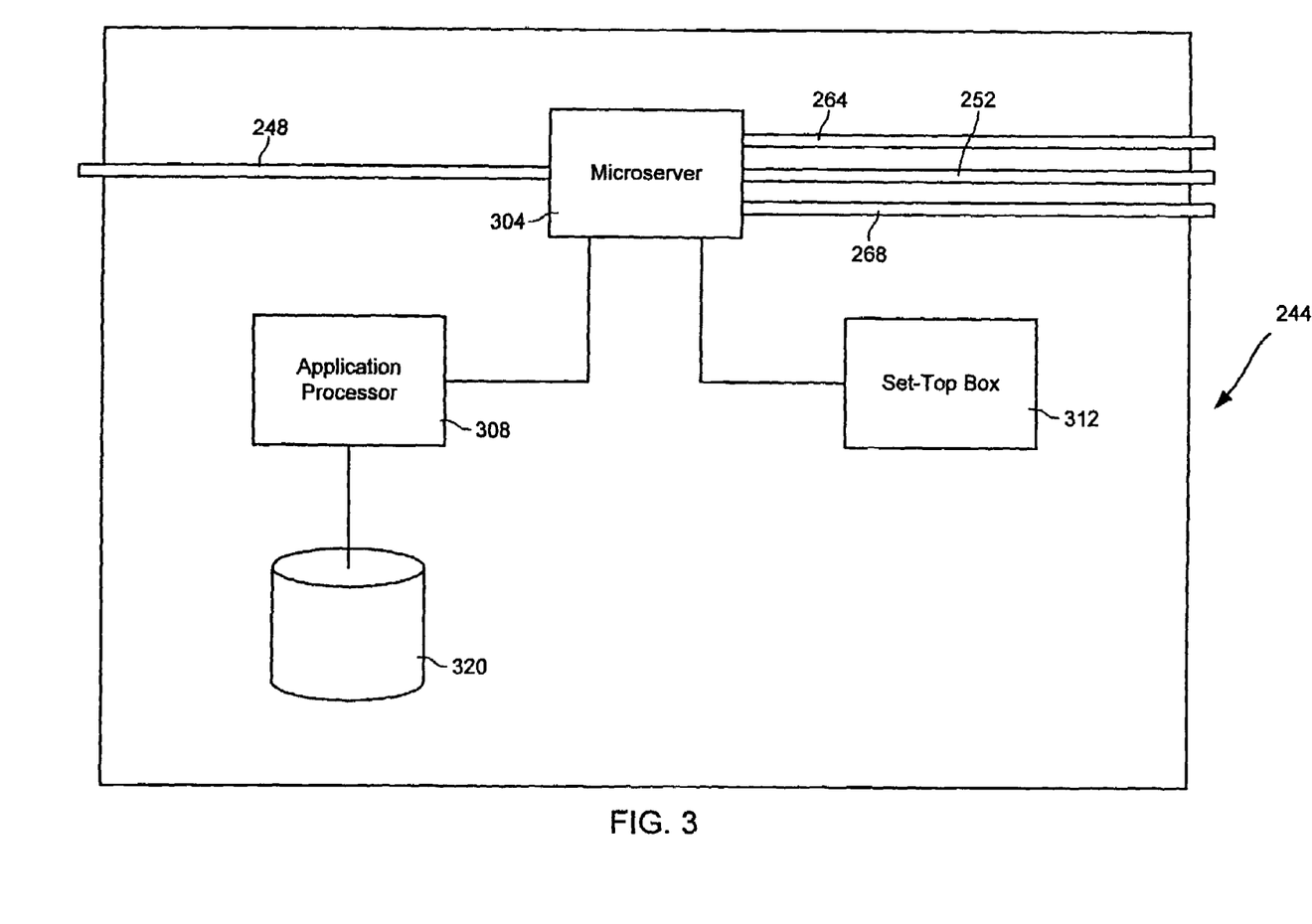
FIG. 3 is a schematic drawing illustrating a processing system that can be included in a network interface device according to certain embodiments of the invention.
Figure 4:
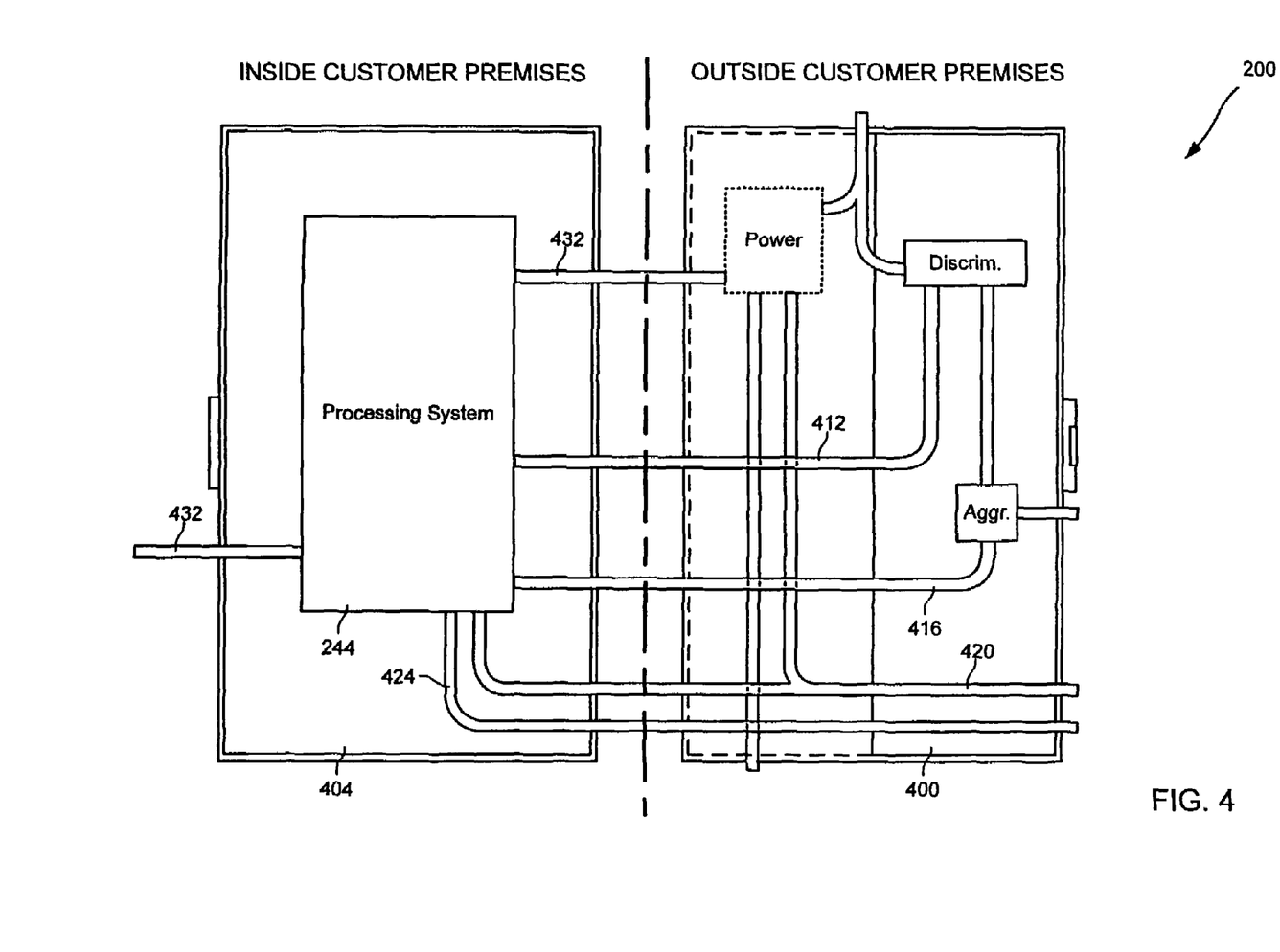
FIG. 4 illustrates a distributed network interface device according to certain embodiments of the invention.

Having described a provision system according to embodiments of the invention attention is directed to FIGS. 2-4, which describe embodiments of CPE that may be employed in connection with the present invention. FIG. 2A, for example, illustrates one embodiment of a Network Interface Device 200. In the illustrated embodiment, NID 200 comprises a clamshell design, with a lid portion 204 and a body portion 208 connected by hinges 212A, 212B. Turning now to FIG. 2B, it can be seen that body portion comprises a network area 216 and a customer area 220. Generally, network area 216 is adapted to receive a cover and is designed generally to be accessible only to personnel authorized by the provider. In contrast, when NID 200 is open, the customer can access customer area 220 to add or remove components as desired. In this and other ways, NID serves to isolate the provider's network from the customer's network. As discussed below, lid portion 204 can contain a processing system (not shown in FIG. 2B)

Returning to FIG. 2A, NID 200 can include a first interface 228 for communicating with the provider's external transport medium. Those skilled in the art will recognize that, in some embodiments, as described above, the external transport medium can be the twisted-pair copper "local loop" running from the customer's premises to the provider's local office, and interface 228 can allow for the attachment of the local loop to NID 200. In other embodiments, the external transport medium can be any of a variety of other media, including satellite transmissions, wireless transmissions, coaxial cable. In fact, in certain embodiments, the external transport medium can comprise multiple transport media (of the same or different types), for which NID 200 could include multiple interfaces. In some such embodiments, NID 200 can function to logically couple or bond a plurality of external transport media to one another, seamlessly increasing the bandwidth available to the customer premises. For instance, a customer premises might have a satellite link to one provider and an ADSL link to another provider, and NID 200 could combine or multiplex these two links to provide an apparent single, higher-bandwidth to the customer premises. Similarly, those skilled in the art will recognize that, in certain of these embodiments, a particular external transport medium (for instance, a satellite link) may be more well-suited to one way transmission of telecommunication information; in such cases, NID 200 could use a second external transport medium (for instance, an ADSL link) to allow transmission in the other direction.

Interface 228 can be coupled to a discrimination device 232, which can be operative to separate information sets received on interface 228 (and, conversely, aggregate information sets for transmission on interface 228). Merely by way of example, in particular embodiments, discrimination device 232 can separate POTS information from other telecommunication information and/or isolate signals on the internal transport medium from the external transport medium (and vice-versa). In some embodiments, for instance xDSL implementations, discrimination device 232 can comprise one or more filters. Such filters can include (but are not limited to) high-pass, low-pass and/or band pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Demarcation device 232 can be operable to separate information sets through a variety of criteria, including for example, by frequency, by destination device, information type, frequency. Further, in certain embodiments, information sets can be multiplexed (for instance, using various time-division multiplexing or wave-division multiplexing schemes known in the art) for transmission over an external transport medium, and discrimination device 232 can comprise a de-multiplexer capable of separating multiplexed signals and, optionally, routing each signal to the appropriate destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional (perhaps non-POTS) information sets to be sent and received through interface 236 simultaneously with the POTS information. This can include, for example, aggregating information sets for transmission of an HPNA (or HPNA+) signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, and/or memory devices, including both volatile and nonvolatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media) In fact, processing system 244 can comprise the equivalent of one or more personal computers, running any of a variety of operating systems, including variants of Microsoft's WindowsTM operating system, as well as various flavors of the UNIXTM operating system, including open source implementations such as the several LinuxTm and OpenBSDTM operating systems.

Telecommunication information (or information sets) can be processed by processing system 244 in a variety of ways, including, for example, routing a given information set to a particular interface, transforming information (for example, encoding/decoding information and converting between different transport protocols), storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality of service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, a NID may comprise another interface in communication with a second distribution point, perhaps operated by a different provider, through an additional external transport medium. In such a case, the additional external interface could be coupled to discrimination device 232, or it could be coupled to another discrimination device, which could also be in communication with processing system 244, interface 236 and/or aggregator 240. Thus, certain embodiments allow a single NID to serve as a communication gateway between the customer premises and multiple providers, including combining or multiplexing multiple external transport media (each of which may be in communication with a different provider and/or telecommunication information provider) as discussed above.

Returning to FIG. 2A, processing system 244 can be in communication with aggregator 240, which, as discussed above, can aggregate non-POTS information sets received from processing system 244 and POTS information sets received directly from discrimination device 232 for consolidated transmission via interface 236, among other functions. In effect, discrimination device 232 and aggregator 240 (perhaps in conjunction with processing system 244) can function to separate telecommunication information received on interface 228 into a set of POTS telecommunication information and a set of non-POTS telecommunication (wherein POTS information can be understood to be ordinary telephone signals, and non-POTS information can be understood to include all other telecommunication information), route the non-POTS information via transport medium 248 to processing system 244 for processing, and route the POTS information to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse (i.e., to separate and recombine different sets of telecommunication information received on interface 236 from the customer's premises). Thus, in some embodiments, both discrimination device 232 and aggregator 240 each can perform a combined discrimination device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244 and could route information sets among any of those components as necessary. Moreover, as described below, the functionality of discrimination device 232 and/or aggregator 240 can be incorporated into processing system 244; likewise, discrimination device 232 can incorporate interface 228 and/or aggregator 240 can incorporate interface 236, such that discrimination device/ and or aggregator comprise the necessary components to be coupled directly to the external and internal transport media, respectively.

Discrimination device 232 and/or aggregator can also serve another function in certain embodiments: Since the external transport medium is coupled to first interface 228 and the internal transport medium can be coupled to, inter alia, second interface 236, the discrimination device and/or aggregator can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system. In yet other embodiments, the isolation device might comprise a separate piece of hardware in communication with discrimination device 232, aggregator 240 and/or processing system 244.

In certain embodiments, NID 200 can have one or more additional interfaces 256, 260 in communication with processing system 244 via transport media 264, 268, respectively. Additional interfaces 256, 260 can be adapted to communicate with any of a variety of internal transport media to send/receive telecommunication information to/from the customer premises. For instance, interface 256 can be a coaxial interface for connection to RG6 and/or RG59 cable, and interface 260 can be an RJ45 and/or RJ11 interface for connection to unshielded twisted pair cable (which can, for instance, form a 10Base-T Ethernet network).

In certain embodiments, NID 200 can comprise a line driver (not shown on FIG. 2A), coupled to processing system 244 and aggregator 240. The line driver can function to allow conversion between various network formats and media, allowing a variety of different media types (e.g., twisted pair and/or coaxial cable, in accordance with the HPNA and HPNA+ standards, as well, perhaps, as the customer premises' A/C wiring, in accordance, for example, with the HomePlug™ standard) to transport combined POTS and non-POTS information sets. If necessary, one or more different line drivers can be used to accommodate a variety of transport media.

The ability of NID 200 to support multiple interfaces of different types allows great flexibility in routing telecommunication information throughout the customer premises. Merely by way of example, if interface 228 receives telecommunication information that includes digitally-encoded video signals (e.g., MPEG-2 data), the information set that includes the encoded video signals can be routed by discrimination device 232 to processing system 244, which can decode the signals into an RF-modulated NTSC, HDTV and/or PAL format and transmit the signals via transport medium 264 to coaxial interface 256, where it can be transmitted via coaxial cable to one or more televisions at the customer premises.

Alternatively, if the customer has a digital set-top box located at the television, the encoded signals can be routed by processing system 244 (perhaps through the appropriate line driver) to aggregator 240, where the signals can be transferred through interface 236 to the set-top box for decoding.

Similarly, in some embodiments, NID 200 might receive IP data (perhaps combined with other types of telecommunication information) on interface 228. The information set comprising the IP data can be routed by discrimination device 232 via medium 248 to processing system 244, where it can be processed, and depending on the embodiment, routed via transport medium 252 to the customer's existing telephone wiring (perhaps using interface 236, optionally in conjunction with aggregator 240 and/or one or more line drivers), routed to a 10Base-T network (perhaps transport medium 268 and interface 260), routed to a coaxial cable (e.g., using transport medium 264 and interface 256), or routed via a wireless interface (not shown in FIG. 2A). Alternatively, the IP data can be routed to any combination of these interfaces, and any of these interfaces could also receive IP or other telecommunication information from a CPE at the customer premises, for routing to processing system 244. In this way, NID 200 can allow virtually unlimited connectivity options for each CPE at the customer premises. Adding to the flexibility of NID 200, processing system 244 can include the necessary components to serve, for instance, as a cable, wireless, or xDSL modem, as well as components necessary to serve as an Ethernet hub, switch, router or gateway, the functions of each of which are familiar to those skilled in the art.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface (e.g., 256), or through a dedicated transformer plugged into an A/C outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

As mentioned above, processing system 244 can comprise a plurality of processing devices, and each processing device can comprise multiple components, including microprocessors, memory devices, storage devices and the like. Merely by way of example, FIG. 3 provides a detailed illustration of exemplary processing system 244, which comprises multiple processing devices 304, 308, 312. In accordance with the exemplified embodiment, transport medium 248 links processing system 244 with an external transport medium (perhaps via a discrimination device and/or interface, as described above).

Transport medium 248 can be coupled to microserver 304, such that any information received by processing system 244 via transport medium 248 is first processed by microserver 304. Microserver can, in some embodiments, be the equivalent of a server computer, complete with memory devices, storage devices, and the like, each of which is known in the art and none of which is illustrated on FIG. 3. In certain embodiments, microserver 304 serves as the controller for the NID, overseeing the NID's configuration and monitoring performance; in some such embodiments, the controller functions can be accessed using a web browser. Depending on the embodiment, microserver 304 can be capable of performing a wide variety of additional functions, including functions related to administering any local area network comprised by the internal transport medium. For instance, microserver 304 can function as an xDSL modem in certain embodiments, allowing a home network attached to the NID to transmit and receive data via an xDSL connection to a provider. Microserver 304 can, in some cases, also function as a hub, bridge, switch or router.

Further examples of functions of microserver 304 in various embodiments include a dynamic host configuration protocol ("DHCP") server, which, as those skilled in the art will appreciate, allows for flexible configuration of an IP network using any internal transport medium attached to the NID, and a network address translation ("NAT") server, which provides some security against unauthorized use of the customer's network. Microserver 304 can also function as a HyperText Transport Protocol ("HTTP") server, which, among other benefits, can allow configuration of the NID through a convenient web interface, as well as a bridge, switch or router, which can be capable of supporting advanced routing techniques, such as MPLS and EFM, to name a few. Microserver 304 can function further to manage quality of service requirements, as described above.

In addition to these functions, microserver 304 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microserver 304 can serve a switching function somewhat similar to that described with respect to discrimination device 232 described in relation to FIG. 2A. For instance, if IP data is received by microserver 304, such data can be routed to an Ethernet connection, to the existing telephone wiring (e.g., in an HPNA implementation), or to any other appropriate medium (perhaps via an appropriate line driver). In fact, in certain embodiments, processing system 244 (and in particular microserver 304) can incorporate the functionality of discrimination device 232 and/or aggregator 240, rendering those components optional.

In addition to microserver 304, processing system 244 can include other components, including, for instance, application server 308 and set-top box 312, which, in the illustrated embodiment, are coupled to microserver 304. Application server 308 can comprise the equivalent of a computer, as described above, and thus can comprise one or more storage devices, such as hard disk drive 320, as well as memory devices, microprocessors and the like, to enable it to store and process telecommunication information and other data. In certain embodiments, application server 308 can perform tasks with processing, memory and/or storage requirements that render microserver 304 unsuitable, including a wide variety of consumer applications. For instance, application server 308 can 20 act as a digital recorder for storing video (perhaps as a video-on-demand server or a personal video recorder), a file and/or application server for a home network attached to the NID, a Voice over IP ("VoIP") server, caller identification server, or voice gateway for a telephone system attached to the NID. Application server 308 can also function as a home security server, allowing the control of various features and configuration options for a home security system.

Set-top box 312, which, in some embodiments, can be coupled to microserver 304 as illustrated on FIG. 3, can provide traditional set-top box functionality (e.g., decoding of television signals, frequency switching, etc.), as well as provide enhanced features, including, for example, the provision of picture-in-picture signals for non picture-in-picture televisions, the provision of video on demand, personal video recorder features, and many other such features.

Processing system 244 can have multiple means of input and output. Merely by way of example, microserver 304 can communicate with one or more external transport media (perhaps, as discussed above, via intermediary devices) using one or more transport media (e.g., 248). Processing system 244 (and, specifically, microserver 304) also can communicate with one or more internal transport media (for example category 5, 5e and/or 6 unshielded twisted pair wire 268, RG6 and/or RG59 coaxial cable 264, and category 3 unshielded twisted pair copper (telephone) wire 252), again possibly via intermediary devices, as discussed with reference to FIG. 2A. Notably, some embodiments of processing system 244 can include interfaces for multiple transport media of a particular type, for instance, if processing system (and, in particular, microserver 304) serves as a networking hub, switch or router. Processing system 244 can also have infra-red and radio-frequency receivers and/or transmitters, for instance to allow use of a remote control device, as well as wireless transceivers, for instance to allow wireless (e.g., IEEE 802.11) networking.

As illustrated on FIG. 3, in some embodiments, microserver 304 manages the connections between application server 308, set-top box 312 and transport media 248, 252, 264, 268, routing data as necessary. In other embodiments, each processor 304, 308, 312 can have independent connections to one or more transport media.

It should be recognized that the devices within processing system 244 are described for illustrative purposes only. The functionality described above with respect to microserver 304, application server 308 and set-top box 312, respectively, each could be incorporated into a single device within processing system 244. Alternatively, their functions described herein could be divided among any number of processors and devices within processing system 244. Thus, the division of functions among devices within processing system 244 is discretionary and should not be considered to limit the scope of the invention.

In accordance with some embodiments, the NID might comprise multiple enclosures, each located in a different location and in communication with one another. Merely by way of example, FIG. 4 illustrates an alternative embodiment of CPE, including a NID 400 and a separate processing system 404. In the illustrated embodiment, NID 400 can include the features described above, except that processing system 404 can be located distal to NID 400. In this way, processing system 404 can be located in a more secure area (for instance, inside the customer premises), while NID 400 can be located conveniently at the exterior of the customer premises, where it can be accessed easily by service personnel. (Of course, it should be noted that a NID can also be hardened, so that it can be securely located in its entirety on the exterior of the customer premises, as, for instance, in the embodiments discussed above.) In some embodiments, processing system 404 can be in communication with NID 400 via similar transport media 412, 416, 420, 424 to those discussed with respect to FIG. 3 (248, 252, 264, 268, respectively) and can include all of the same functionality of the embodiments discussed above. As illustrated in FIG. 4, processing system 404 generally will draw power from its own source 428, although it could also be powered by NID 400, either via one of the transport media 412, 416, 420, 424 or through a separate power connection 432.

Figure 5:
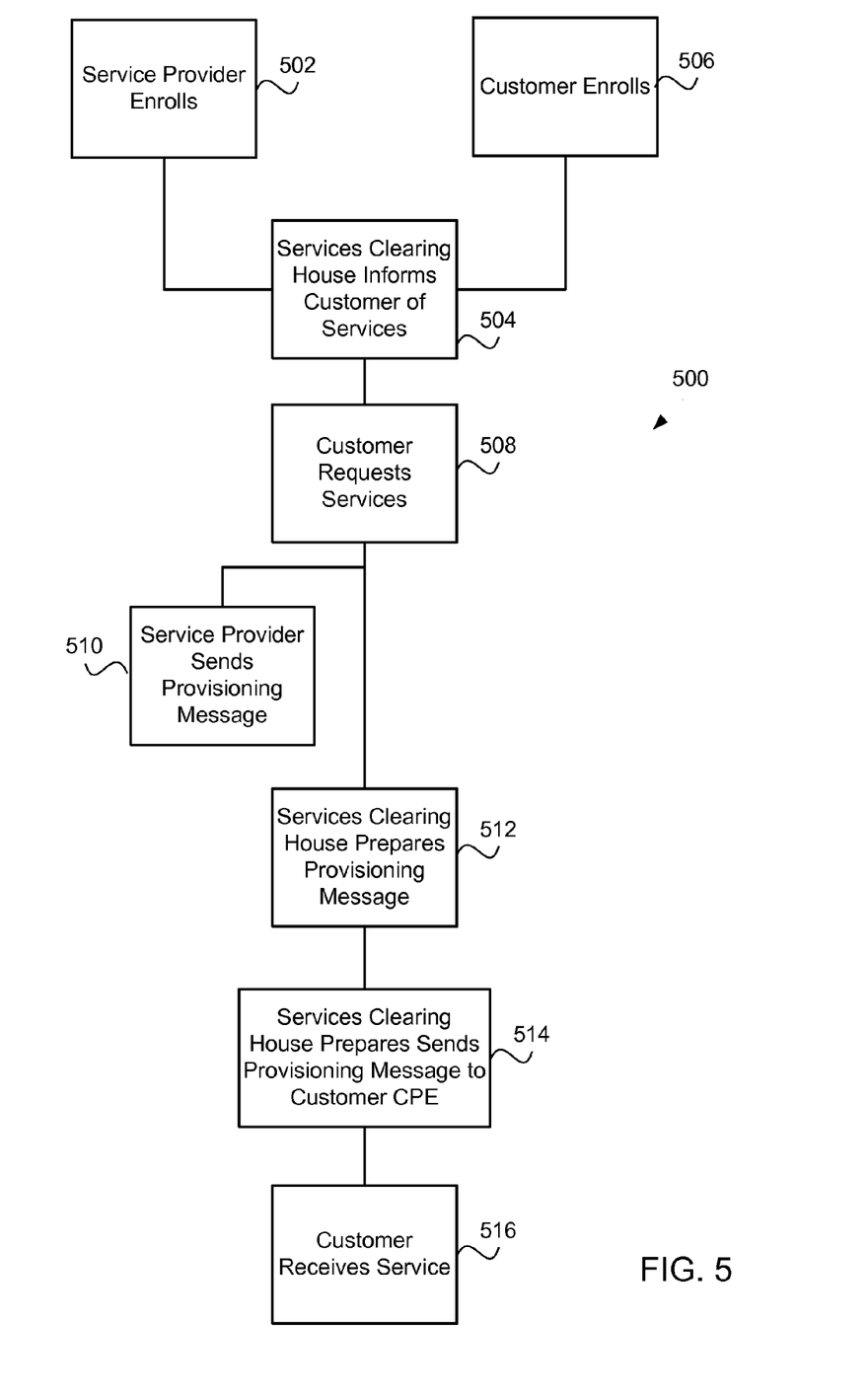
FIG. 5 illustrates a method of using a provisioning system according to embodiments of the invention.

Having described an embodiment of a system according to the invention and several exemplary CPE devices that may be used with it, attention is directed to FIG. 5, which illustrates an exemplary method 500 of provisioning telecommunication services to a customer's premises according to embodiments of the invention. Methods according to other embodiments may have more steps, fewer steps, different steps, and/or the steps may be traversed in different orders. Thus, it is to be understood that the method 500 is merely one example, and that those skilled in the art will realize other examples in light of this disclosure.

The method begins with a provider enrolling with the services clearing house at block 502. In one example, this is carried out by the provider sending an electronic message to the services clearing house through a network, such as the network 102. The message may be in a provisioning language that is unique to the system of the present invention, or the provisioning language may be in common use. In a specific example, the programming language comprises XML code. Digital certificates may be used to limit unauthorized access, in which case, this operation comprises a verification process relating to the digital certificates. Even if digital certificates are not used, this operation may involve authorization verification using other methods.

As mentioned previously, the provider also may be a consumer of services. For example, a customer that presently receives network access services from a provider may decide that he wants to make content available to other customers. The customer registers, or enrolls, with the services clearing house as described above, thus becoming a provider.

The enrollment process may involve, for example, describing the service to be provided, defining the CPE needed to receive the service, describing the customers to whom the service is available, and the like. The services clearing house then stores the information.

At block 504, the services clearing house makes the services information available to customers. This may be either an active process or a passive process. For example, the services clearing house may automatically send information regarding services to eligible customers, or the services clearing house may provide the information upon request. In some examples, the two are combined.

At block 506, a customer enrolls CPE. This operation may be carried out in any of a number of ways. For example, the CPE may include enrollment script that executes automatically upon connection of the CPE with the network. In such cases, the customer merely attaches the CPE to the network and the CPE provides the necessary information to the network for the customer to become eligible to begin receiving services. In other examples, the customer may need to go through a series of steps to enroll the CPE. Other examples are possible.

At block 508, the customer requests a particular service. The customer may do so in any of a number of ways. In one example, the customer contacts the provider directly and gives the provider information relating to the customer's CPE (e.g., the address of the CPE, the type of CPE, and the like). This allows the provider to construct a provisioning message to send to the customer's location or to send a request to the services clearing house to do so. In another example, the customer sends the request directly to the services clearing house. In this way the service may be provisioned without having to alert the provider. The services clearing house is then able to evaluate whether the customer is eligible for the service, whether the customer has the correct CPE, and the like.

At block 510, the provider prepares a provisioning message to provision the service requested by the customer. As stated previously, the provisioning message may comprise a message in a standardized provisioning language. In a specific embodiment, the provisioning language is coded using, for example, XML. The provider then sends the provisioning message to the services clearing house. A digital certificate may be used to verify the provider's authority to access the customer's CPE. In another example, the provider accesses the services clearing house to construct the provisioning message. In this example, the provider may access the services clearing house through a network, such as the Internet, using a web browser, for example. Thus, in this example, the services clearing house functions as a host computer system with which providers may interact without the need for customized equipment at their location to construct provisioning messages.

At block 512, the services clearing house prepares a provisioning message. In some embodiments, this comprises reformatting a provisioning message sent from a provider. In other embodiments, this comprises constructing the message in response to a customer's request without having received a message from a provider. Thus, in this case, the customer requests a service from the clearing house and the clearing house responds by provisioning the customer's CPE without engaging the provider. In yet other embodiments, this comprises constructing a provisioning message in response to interactive communication with a provider. Other examples are possible.

At block 514, the provisioning message is sent to the customer's location. The customer's CPE receives the provisioning message, decodes it as necessary, and uses the information to configure itself to receive the requested services. If there is a failure to properly provision the CPE, the services clearing house will receive an appropriate alert. At block 516, the customer receives the requested service.

Figure 6:
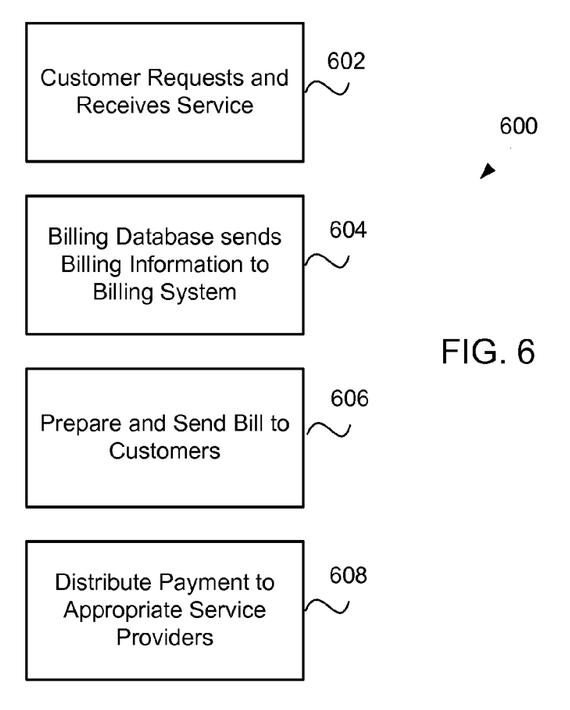
FIG. 6 illustrates a method of billing a customer for telecommunication services using a provisioning system according to embodiments of the invention.

Having described an embodiment of a method of configuring a customer's CPE to receive telecommunication services, attention is directed to FIG. 6, which illustrates a method 600 of billing a customer for telecommunication services. In this embodiment, the customer is billed by a single entity for multiple telecommunication services. The bill may be prepared periodically, such as for subscription services, or may occur in response to a request for services "on demand." Thus, at block 602, the customer has requested and received a service. At block 604, the billing database provides information to a billing system. The information may comprise the service the customer requested and received, the provider from whom the customer received the service, the cost of the service, and the like. The information may include billing information from multiple providers, if applicable.

At block 606, the billing system prepares and transmits a bill to the customer. The bill may be transmitted electronically or in paper form. In some embodiments, this comprises debiting an amount from an account of the customer, charging a customer's credit card for the statement, debiting an amount from a bank account of the customer, and/or the like. Thus, in some cases, transmitting a bill to the customer merely comprises sending the customer a statement detailing the services for which the customer was charged and the manner in which the charge was settled. Other examples are possible.

At block 608, payment information is transmitted to the appropriate service providers that provider the service and/or content to the customer. This may comprise sending electronic and/or paper statements to the providers, and/or crediting amounts tendered to the appropriate accounts of the provider. Other examples are possible.

Figure 7:
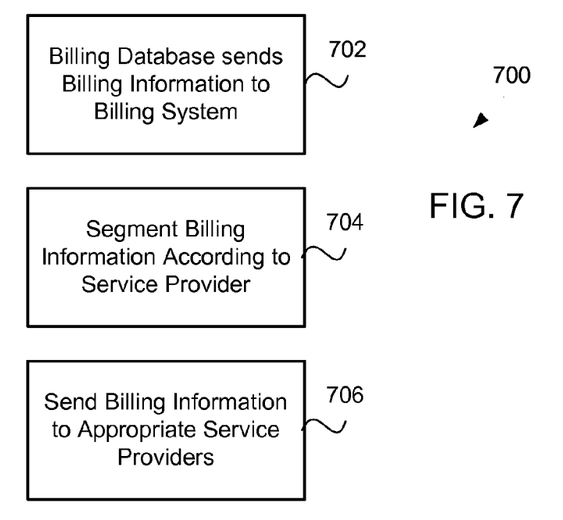
FIG. 7 illustrates a second method of billing a customer for telecommunication services using a provisioning system according to embodiments of the invention.

The method of FIG. 7 illustrates another possible method 700 for billing customers for services. In this embodiment, as in the last, the customer may be billed periodically or may be billed in response to an on demand request for services. In this embodiment, at block 702 the billing database transmits customer billing information to a billing system. The billing system then segments the information into groups according to the provider that provided the service to the customer at block 704. At block 706, the billing system sends then sends billing information, which may include billing information for multiple customers, to the appropriate providers. Other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of provisioning telecommunication offerings, comprising:
    receiving from a first provider a message at a services clearing house to provision a telecommunication offering at a customer's premises;
    processing the request into a provisioning message;
    directing the provisioning message to the customer's premises, thereby causing the offering to be provisioned at the customer's premises;
    maintaining the offering at the customer's premises;
    receiving a request for the service from the customer;
    directing the request to the first provider;
    receiving from a second provider a message at the services clearing house to provision a different telecommunication offering at a different customer's premises;

processing the request into a provisioning message; and directing the provisioning message to the different customer's premises, wherein the second provider is different from the first provider.

2. The method of claim 1, wherein directing the provisioning message to the customer's premises comprises directing the provisioning message to customer premises equipment at the customer's premises.

3. The method of claim 2, wherein the customer premises equipment comprises a network interface device configured to receive provisioning information via a wireless transmission.

4. The method of claim 2, wherein the customer premises equipment is selected from the group consisting of network interface device, video receiver, broadband modem, and telephone receiver.

5. The method of claim 1, wherein maintaining the offering at the customer's premises comprises querying customer premises equipment.

6. The method of claim 1, wherein maintaining the offering at the customer's premises comprises sending a diagnostic request to the customer's premises.

7. The method of claim 6, wherein the diagnostic request comprises data update and equipment reboot commands.

8. A method of provisioning telecommunication offerings, comprising:

receiving from a provider a message comprising an offering;

receiving from a consumer of telecommunication offerings an enrollment message;

providing a list of offerings to the consumer;

receiving a request to provision at least one telecommunication offering to the consumer, wherein receiving of the request to provision at least one telecommunication offering to the consumer comprises receiving the request from a provider;

comprising verifying the provider's authority to provision the service, wherein verifying the provider's authority to provision the service comprises confirming the provider's identity using a digital certificate;

preparing a provisioning message relating to the request;

transmitting the provisioning message to a location of the consumer, thereby causing the offering to be provisioned; and maintaining the offering at the location of the consumer.

9. The method of claim 8, wherein receiving from a provider a message comprising an offering comprises receiving a type of offering, information indicating a type of customer premises equipment used to receive the offering, and information from which eligible consumers may be determined.

10. The method of claim 8, further comprising storing information relating to the message in a centralized services database.

11. The method of claim 8, wherein receiving from a consumer of telecommunication offerings an enrollment message comprises receiving customer information comprising a type of customer premises equipment of the customer and information used to determine telecommunications offerings the customer is eligible to receive.

12. The method of claim 8, wherein receiving a request to provision at least one telecommunication offering to the consumer comprises receiving the request from the consumer.

13. The method of claim 8, wherein preparing a provisioning message relating to the request comprises preparing the provisioning message using XML.

14. The method of claim 8, wherein maintaining the offering at the location of the customer comprises querying a customer premises equipment.

15. The method of claim 8, wherein maintaining the offering at the location of the customer comprises sending a diagnostic request to the location of the customer.

16. The method of claim 15, wherein the diagnostic request comprises data update and equipment reboot commands.

17. A telecommunication provisioning system, comprising:

a services clearing house configured to receive telecommunication offerings from a plurality of providers and direct the telecommunication offerings to a plurality of customers via customer premises equipment; and a provisioning arrangement configured to receive requests to provision and maintain telecommunication offerings from a plurality of service providers to a plurality of customers at each customer's premises, receive a request for the service from a first customer from the plurality of customers, direct the request to a first provider from the plurality of providers;

wherein the services clearing house is further configured to receive, from a second provider from the plurality of providers, a message to provision a different telecommunication offering at a different customer's premises, process the request into a provisioning message, and direct the provisioning message to the different customer's premises, wherein the second provider is different from the first provider.

18. The system of claim 17, wherein the telecommunication offerings are selected from the group consisting of video programming, broadband access, and telephone service.

19. The system of claim 17, further comprising a billing system that periodically provides to providers information relating to the telecommunication offerings provisioned to customers.

20. The system of claim 17, further comprising a distribution network through which both telecommunication offerings and provisioning messages are provided from the services clearing house to customers.

21. The system of claim 17, wherein the provisioning arrangement comprises means for communicating with each of the plurality of providers in a common provisioning language.

22. The system of claim 17, wherein the provisioning arrangement comprises an arrangement configured to query customer premises equipment.

23. The system of claim 17, wherein the arrangement configured to query customer premises equipment includes an arrangement configured to send a diagnostic request to customer premises equipment.

24. The system of claim 23, wherein the diagnostic request comprises data update and equipment reboot commands.

* * * * *

UNITED STATES PATENT AND TRADEMARK OFFICE
CERTIFICATE OF CORRECTION

PATENT NO. : 7,734,282 B2
APPLICATION NO. : 10/652719
DATED : June 8, 2010
INVENTOR(S) : Steven M. Casey and Bruce A. Phillips It is certified that error appears in the above-identified patent and that said Letters Patent is hereby corrected as shown below:

Column 1, Line 32, delete "Such services calls" and insert --Such service calls--, therefor.

Column 2, Line 17, delete "present inventor" and insert --present invention--, therefor.

Column 7, Line 17, delete "one or microprocessors," and insert --one or more microprocessors,--, therefor.

Signed and Sealed this

Twenty-third Day of November, 2010

David J. Kappos
*Director of the United States Patent and Trademark Office*